United States Patent [19]

Sato

[11] 3,981,327
[45] Sept. 21, 1976

[54] PRESSURE REGULATION VALVE DEVICE

[76] Inventor: Kichiro Sato, c/o Mitsuhata No. 19-9,1-chome, Shin, Setagaya, Tokyo, Japan

[22] Filed: July 9, 1975

[21] Appl. No.: 594,465

[30] Foreign Application Priority Data

July 11, 1974 Japan............................ 49-79415
Oct. 28, 1974 Japan............................ 49-124053

[52] U.S. Cl. ............................ 137/613; 137/505.25
[51] Int. Cl.² ........................................ G05D 16/10
[58] Field of Search ...................... 137/505.25, 613

[56] References Cited
UNITED STATES PATENTS 3,911,988   10/1975   Richards ................ 137/505.25 X Primary Examiner—Robert G. Nilson
Attorney, Agent, or Firm—Frank J. Jordan

[57] ABSTRACT

A pressure regulation valve device comprising a multi-diameter hollow cylindrical main body provided with a linear fluid passage and a valve seat and including different diameter portions with the largest diameter portion defining a pressure regulation chamber, a multi-diameter pressure regulation valve received within said main body for seating on and unseating from said valve seat and a pressure receiving portion provided by the largest diameter portion of said pressure regulation valve received in said largest diameter portion of the main body, said pressure receiving portion of the pressure regulation valve defining a secondary pressure chamber on one side and a reference pressure chamber on the opposite side within said pressure regulation chamber, a primary pressure passage formed in said largest diameter portion of the main body in communication with said reference pressure chamber, a reference pressure setting valve disposed in said primary pressure passage provided in said valve body and a communication passage extending from said valve seat to said secondary pressure chamber.

4 Claims, 5 Drawing Figures

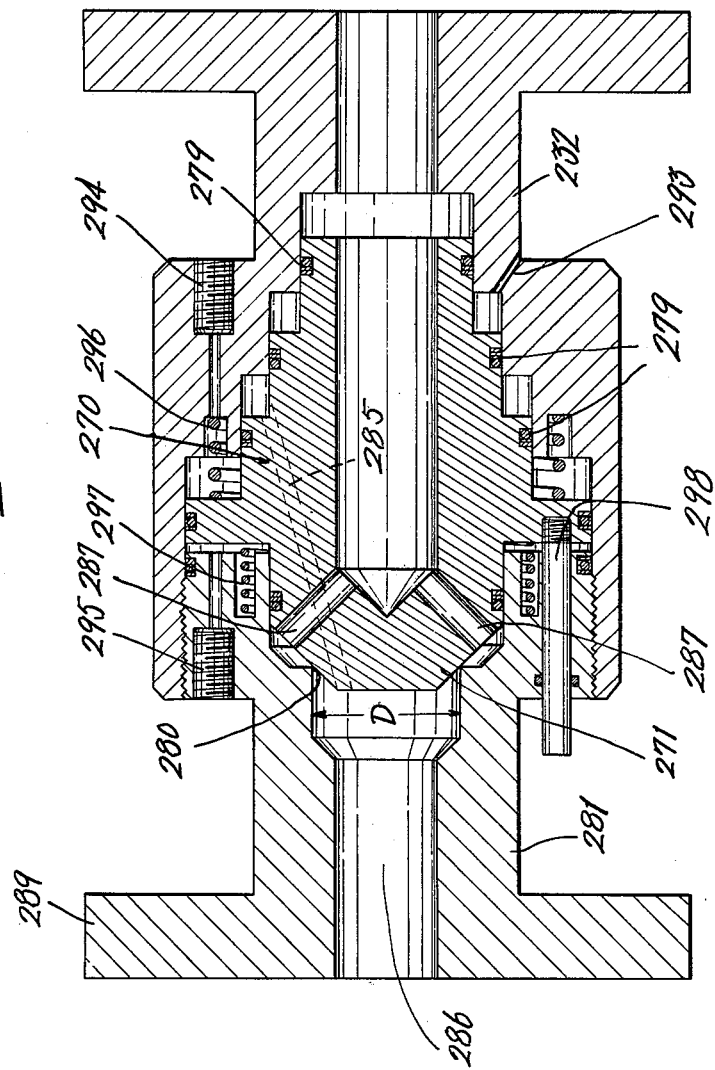

PRESSURE REGULATION VALVE DEVICE

BACKGROUND OF THE INVENTION

This invention relates to a pressure regulation valve device and more particularly, to a pressure regulation valve device for use in a high pressure system having a linear axial passage for high pressure fluid and wherein the pressure regulation valve is provided in the axial linear passage, whereby a secondary pressure is controlled regardless of the magnitude of a primary pressure so as to allow fluid to pass through the valve device under constant pressure.

There have been proposed and practically employed a great variety of pressure regulation valve devices of the type in which the valve body is maintained under balanced conditions by providing pressure receiving faces which are subjected to pressures in the opposite directions, with the same cross-section area and in such a valve device, the valve body is designed to receive pressure fluids on the opposite faces of the valve body. In the above-type prior art pressure regulation valve device, since the valve seat is provided in the horizontal position within the valve body and the valve plate is adapted to seat on or unseat from the horizontal valve seat, the fluid is introduced within the valve main body on one side of the valve body and then diverges upwardly and downwardly to be applied on the other side of the valve body so as to maintain the valve body in balanced condition to allow the fluid to pass by the valve seat. When the pressure is applied against the valve seat in the direction for urging the valve plate to unseat from the valve seat, the valve plate is then subjected to the pressure in the opposite or valve closing direction to block the passage of the pressure fluid. Therefore, although the valve body of the prior art pressure regulation valve device can be maintained under balanced condition, the valve body encounters a great deal of fluid registance thereby making it difficult to maintain a reference pressure constant.

SUMMARY OF THE INVENTION

Therefore, one principal object of the present invention is to provide a novel and improved pressure regulation valve device which can effectively eliminate the difficulties inherent in the prior art pressure regulation valve devices.

Another object of the present invention is to provide a novel and improved pressure regulation valve device in which the valve body encounters a relatively low fluid resistance and a predetermined reference pressure can be attained regardless of any fluctuation in a primary pressure.

A further object of the present invention is to provide a pressure regulation valve device which has an excellent service life and in which the valve body can be maintained under balanced condition and no fluid leakage occurs even when a substantially high pressure fluid is passed therethrough.

The above and other objects and attendant advantages of the present invention will be more readily apparent to those skilled in the art from a reading of the following detailed description in conjunction with the accompanying drawings which show one preferred embodiment of the invention for illustration purpose only, but not for limiting the scope of the invention in any way.

BRIEF DESCRIPTION OF THE DRAWINGS

The accompanying drawings show one preferred embodiment of pressure regulation valve device constructed in accordance with the present invention in which;

FIG. 5 is a longitudinally sectional view of a further modified embodiment of a flow rate adjusting valve of the present invention.

PREFERRED EMBODIMENTS OF THE INVENTION

The present invention will be now be described in detail by referring to the accompanying drawings which show preferred embodiments of pressure regulation valve devices of the invention for illustration purpose only, but not for limiting the scope of the invention in any way.

Figure 1:
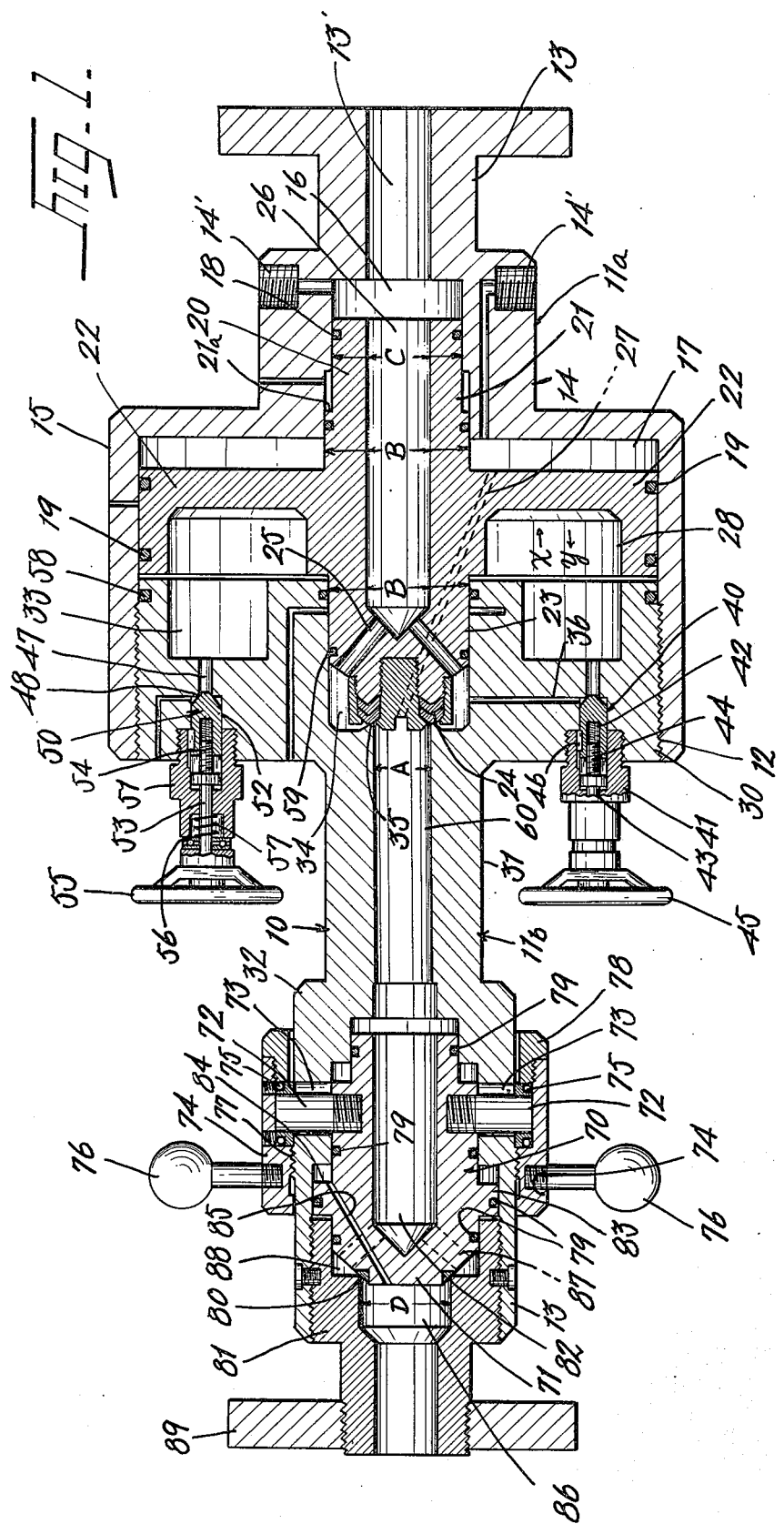
FIG. 1 is a longitudinally sectional view of a first embodiment of a pressure regulation valve device according to the invention.
Figure 2:
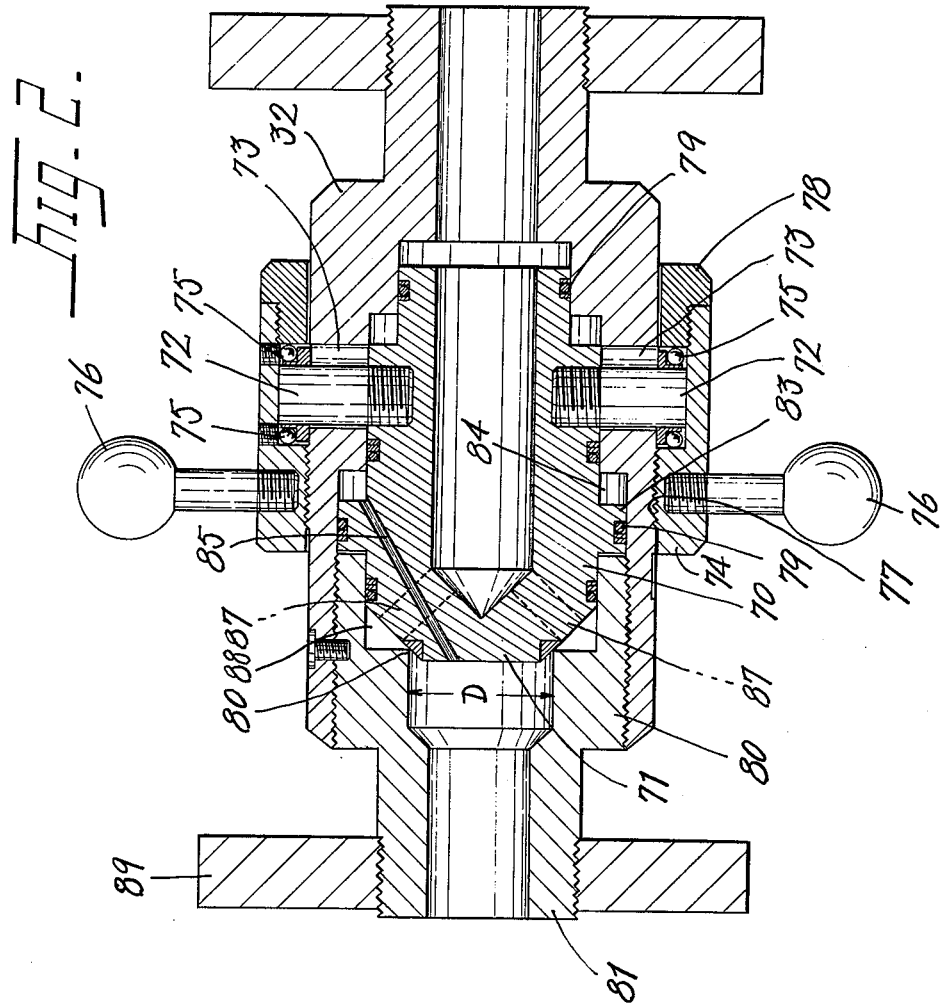
FIG. 2 is a longitudinally sectional view on an enlarged scale of the flow rate adjusting valve employed in the pressure regulation valve device of FIG. 1.

First referring to FIGS. 1 and 2 of the accompanying drawings which show the preferred embodiment of a pressure regulation valve device of the invention for illustration, as seen in these Figures, the pressure regulation valve device is generally shown by reference numeral 10 and generally comprises a hollow cylindrical main body which includes two half body portions 11a and 11b threaded together at 12 as more clearly shown in FIG. 1. The first or right-hand half body portion 11a (as seen in FIG. 1) is a multi-diameter hollow cylindrical member which includes a flanged right-hand end portion 13 through which a linear pressure fluid passage 13' extends in the axial direction of the portion, an intermediate portion 14 which has a greater diameter than the right-hand end portion 13 and in which secondary pressure gauge communication ports 14' are provided, and a left-hand end portion 15 which has a greater diameter than the intermediate portion 14. The axial passage 13' is open at the inner end into the interior of the intermediate portion 14. A multi-diameter pressure regulation valve 20 is slidably and concentrically received within the body portion 11a and integrally includes a smaller diameter or right-hand end portion 21, a larger diameter portion 22 and a smaller diameter or left-hand end portion 23 which has the same diameter as the right-hand end portion 21 and forms a valve body for the purpose to be described hereinafter. The cross-sectional area of the smaller diameter valve portions 21 and 23 will be defined as B for the purpose to be described hereinafter. The right-hand end portion 21 of the valve 20 is slidably received in the intermediate body portion 14 to define a pressure regulation chamber 16 between the right-hand end face of the valve portion and the adjacent wall of the associated body portion and similarly, the larger diameter portion 22 of the valve 20 is slidably recieved in the larger diameter portion or left-hand end portion 15 of the main body to define a secondary pressure chamber 17 between the right-hand end face of the valve portion 22 and the adjacent wall of the left-hand end portion 15 of the right-hand body half portion 11a. The smaller diameter right-hand end portion 21 is further reduced in its diameter at 21a so as to cancel the primary pressure of fluid flowing from an external pressure fluid source (not shown) into the pressure regulation valve device 10 through the linear pressure fluid passage 13'. The cross-sectional area of the further reduced diameter portion 21a of the right-hand end valve portion 21 will be referred as C for the purpose to be described hereinafter. Fluid tight seals 18 and 19, such as bellow type seals or O-rings, are provided between the valve right-hand end portion 21 and the intermediate diameter body portion 14 and the larger diameter valve portion 22 and the largest diameter body end portion 15, respectively, for sealing the interfaces. The left-hand valve end portion 23 is reduced in its diameter at the inner or left-hand end and supports a valve plate unit 24, and the left-hand valve end portion further is provided with slanted fluid passages 25 which extend radially and outwardly at an angle with respect to the axis of the valve end portion. An axial fluid communication passage 26 extends through the right-hand end and intermediate portions 21 and 22 in the valve 20 and terminates at and connects to the inner ends of the fluid passages 25. A second slanted fluid pressure communication passage 27 extends through the intermediate and left-hand end valve portions 22 and 23 at an angle with respect to the axis of the valve 20 and communicates at the outer or right-hand end (as seen in FIG. 1) with the secondary pressure chamber 17. The intermediate or larger diameter valve portion 22 is provided with an annular recess 28 which serves as a coaxial reference pressure chamber a portion of which is defined by the left-hand body half portion 11b as will be described hereinafter.

The left-hand body half portion 11b integrally includes a largest diameter or right-hand end portion 30 (as seen in FIG. 1), an intermediate or smallest diameter portion 31 and a medium diameter or left-hand end portion 32. The largest diameter right-hand end portion 30 of the left-hand body half portion 11b is threaded in the left-hand end portion 15 of the right-hand body half portion 11a at 12 as described hereinabove. The right-hand end face of the right-hand end portion 30 of the left-hand body half portion 11b is provided with a coaxial annular recess 33 which forms the reference pressure chamber in cooperation with the annular recess 28 in the left-hand end portion 15 of the right-hand body half portion 11a. The right-hand end face of the right-hand end portion 30 of the left-hand body half portion 11b which slidably receives the left-hand valve end portion 23 is also provided with a center circular recess 34 the bottom of which forms a valve seat 35 against which the valve plate unit 24 is adapted to abut and from which the valve plate unit is adapted to separate as will be described hereinafter. The right-hand end portion 30 of the left-hand body half portion 11b includes a radial fluid pressure communication passage 36 of a substantially L-shaped cross-section which communicates at the opposite ends with the circular recess 34 and the annular recess 33, respectively. The left-hand end (as seen in FIG. 1) of the L-shaped pressure fluid communication passage 36 forms a valve seat for the purpose to be described hereinafter. A reference pressure setting valve 40 is threaded in the right-hand end portion 30 of the left-hand body half portion 11b and includes a valve housing 41 threaded in the end portion 30 of the body half portion 11b, an internally threaded valve body 42 received within the valve housing 41 and a valve rod 43 which has an externally threaded end portion 44 in threaded engagement with the valve body 42. A manual handle 45 is keyed to the valve body 42 so that by turning the handle 45 in one or the other direction, the reference pressure setting valve 40 can be seated against or separated from the valve seat formed in the communication passage 36 so as to adjust the setting value of the reference pressure.

The right-hand end portion 30 of the left-hand body half portion 11b is further provided with a meandering pressure fluid discharge passage 47 including a first horizontal portion, a vertical portion communicating at the upper end with the right-hand end of the first horizontal portion and a second horizontal portion communicating at the left-hand end with the vertical portion and at the right-hand end with the annular recess 33, respectively. The left-hand end of the second horizontal portion of the pressure fluid discharge passage 47 forms a valve seat 48 for the purpose to be described hereinafter. A pressure fluid discharge valve 50 is threaded in the right-hand end portion 30 of the left-hand body half portion 11b and includes a housing 51 threaded in the body right-hand end portion 30, an internally threaded valve body 52 received in the valve housing and a valve rod 53 having an externally threaded end portion 54 in threaded engagement with the valve body 52. A manual handle 55 is keyed to the valve body 52 and thrust bearings 56 are provided about the valve rod between the valve housing 51 and handle 55. A coiled spring 57 is provided about the valve rod 53 between the bearings 56 and housing 51 for normally urging the valve body 52 against the valve seat 48. Seals 58, such as bellow type seals or O-rings, are provided between the left-hand end portion 15 of the right-hand body half portion 11a and the right-hand end portion 30 of the left-hand body half portion 11b to seal the interfaces and similarly, seals 59, such as bellow type seals or O-rings, are provided between the left-hand end valve portion 23 and the right-hand end portion 30 of the left-hand body half portion 11b to seal the interfaces, respectively.

An axial linear pressure fluid passage 60 extends through the right-hand end and intermediate portions 30, 31 of the left-hand body half portion 11b and communicates at one end or the right-hand end (as seen in FIG. 1) with the circular recess 34 in the right-hand end portion 30 of the valve 20. The cross-sectional area of the axial pressure fluid passage 60 is designated as A and the area A equals to the area B minus the area C, that is, $A = B - C$.

A pressure fluid flow rate adjusting valve which is generally shown by reference numeral 70 is provided within the left-hand end portion 32 of the left-hand body half portion 11b. The pressure fluid flow rate adjusting valve 70 generally comprises a multi-diameter valve body 71 which has four equally spaced connection rods 72 radially extending through slots 73 formed in the outer periphery of the body and the rods are threaded at the inner ends in the valve body with the outer ends projecting beyond the outer periphery of the valve body 71. An annular rotary member 74 is journalled about the protruding outer ends of the connection rods 72 by means of thrust bearings 75 and the annular rotary member has four handles 76 extending radially and outwardly of the annular member 74. The annular member 74 is threaded about the left-hand end portion of the left-hand body half portion 11b at 77. An annular spacer 78 is disposed about the left-hand end portion 32 of the left-hand body half portion 11b and has a threaded outer surface which is in threaded engagement with the threaded inner surface of the annular member 74. As the rotary annular member 74 is rotated about the left-hand end portion 32 of the left-hand body 11b in one or the other direction, the connection rods 72 slide back and forth along the left-hand body half portion 11b to seat the valve body 71 against or separate away from a valve seat 80 defined by the stepped inner end of an annular insert member 81 which is threaded in the left-hand end portion 32 of the left-hand body half portion 11b. Seals 79, such as below type seals or O-rings, are provided between the left-hand end portions 32 of the left-hand body half portion 11b and flow rate regulation valve 90 and between the valve 90 and annular insert member 81, respectively, to seal the interfaces.

The flow rate adjusting valve 70 has an axial pressure fluid passage 82 which is aligned and communicated with the axial pressure fluid passage 60 in the left-hand body half portion 11b. The largest diameter portion of the valve 70 defines a pressure receiving section 83 which is positioned within an annular space 84 defined between the opposite faces of the left-hand end portion 32 of the left-hand body half portion 11b and the annular insert member 81. The valve body 71 is provided with a communication passage 85 which slants with respect to the axis of the valve body 71 and communicates at the rear or inner end with the annular space 84 and at the front end with the multi-diameter axial pressure fluid passage 86 in the annular insert member 81. The multi-diameter passage 86 has a smaller diameter portion and a larger diameter portion the cross-sectional area of the latter being defined as D which is smaller than the cross-sectional area C, but larger than the cross-sectional area A. Outlet ports 87 are provided in the valve body 71 and extend radially and outwardly from the axial passage 82 at an angle with respect to the axis of the valve body. The outer or left-hand end of the valve body 71 is bevelled so as to define an annular flow rate adjusting chamber 88 in cooperation with the inner end face of the insert member 81. An annular flange 89 is threaded about the insert member 81 to connect the pressure fluid regulation valve of the invention to a suitable device on the discharged side of the valve device.

In operation, a fluid under pressure is supplied from an external fluid pressure source (not shown) through the linear pressure fluid passage 13' into the pressure fluid regulation valve device and the fluid then passes into the axial fluid passage 26 in the pressure regulation valve 20. The fluid then passes from the axial passage 26 through the fluid passages 25 into the circular recess 34 to pass by the valve seat 35 whereupon the pressure regulation valve 20 counterbalances the primary pressure because the above-mentioned cross-sectional area ratio, that is, the cross-sectional area A of the axial pressure fluid passage 60 in the left-hand body half portion 11b equals to the cross-sectional area B of the valve smaller diameter portions 21, 23 minus the cross-sectional area C of the further reduced diameter section of the smaller diameter valve right-hand end portion 21.

Thus, after having passed by the valve seat 35, a portion of the pressure fluid passes through the second slanted fluid passage 27 into the secondary pressure chamber 17 to urge the larger diameter portion 22 of the pressure regulation valve 20 leftwards as seen in FIG. 1. Simultaneously, the rest of the fluid which has passed by the valve seat 35 passes through the radial fluid pressure communication passage 36 into the reference fluid pressure chamber 28, 33 to urge the larger diameter portion 22 of the pressure fluid regulation valve 20 rightwards as seen in FIG. 1 in opposition to the force of the pressure fluid entering the secondary pressure chamber 17 which tends to urge the valve portion 22 leftwards.

The reference pressure setting valve 40 is initially set to provided a desired counter-flow value by means of a suitable graduation (not shown) before the operation of the pressure fluid regulation valve device of the invention is initiated. The reference pressure thus provided by the reference pressure setting valve 40 flows into the reference pressure chamber 28 to urge the valve larger diameter portion 22 in the X direction as seen in FIG. 1 whereas the pressure fluid entering the secondary pressure chamber 17 urges the valve larger diameter portion 22 in the Y direction as seen in FIG. 1 in opposition to the X direction to thereby balance the pressure regulation valve 20. With the pressure regulation valve 20 maintained in its balanced condition, the valve plate unit 24 is maintained separate from the valve seat 35 to allow the fluid to pass by the valve seat at the set pressure. When the pressure of the fluid entering the secondary pressure chamber 17 exceeds the set reference value, the larger diameter portion 22 of the pressure regulation valve 20 is acted upon by the pressure in secondary pressure chamber 17 and overcomes the fluid pressure which urges the valve portion 22 to the right as shown in FIG. 1. When this occurs the valve plate unit 24 is urged against the valve seat 35 to block the passage of the fluid past the valve seat 35.

After the valve plate unit 24 has been seated against the valve seat 35 to block the passage of fluid, the pressure within the secondary pressure chamber 17 tends to decrease. When this occurs the valve plate unit 24 unseats from the valve seat 35, whereby the fluid then passes past the valve seat 35 at the set reference pressure. Thus, it will be understood that the secondary fluid pressure can be regulated regardless of the magnitude of the primary fluid pressure. When the valve body 71 is urged to seat against the valve seat 80 under the pressure of fluid, backpressure is generated across the cross-sectional area D of the larger diameter portion of the axial fluid passage 86 in the insert member 81 and the backpressure acts on the opposite face of the valve body 71 having the same cross-sectional area to balance the valve 70 so as to allow pressure fluid to pass by the valve seat 80.

Figure 3:
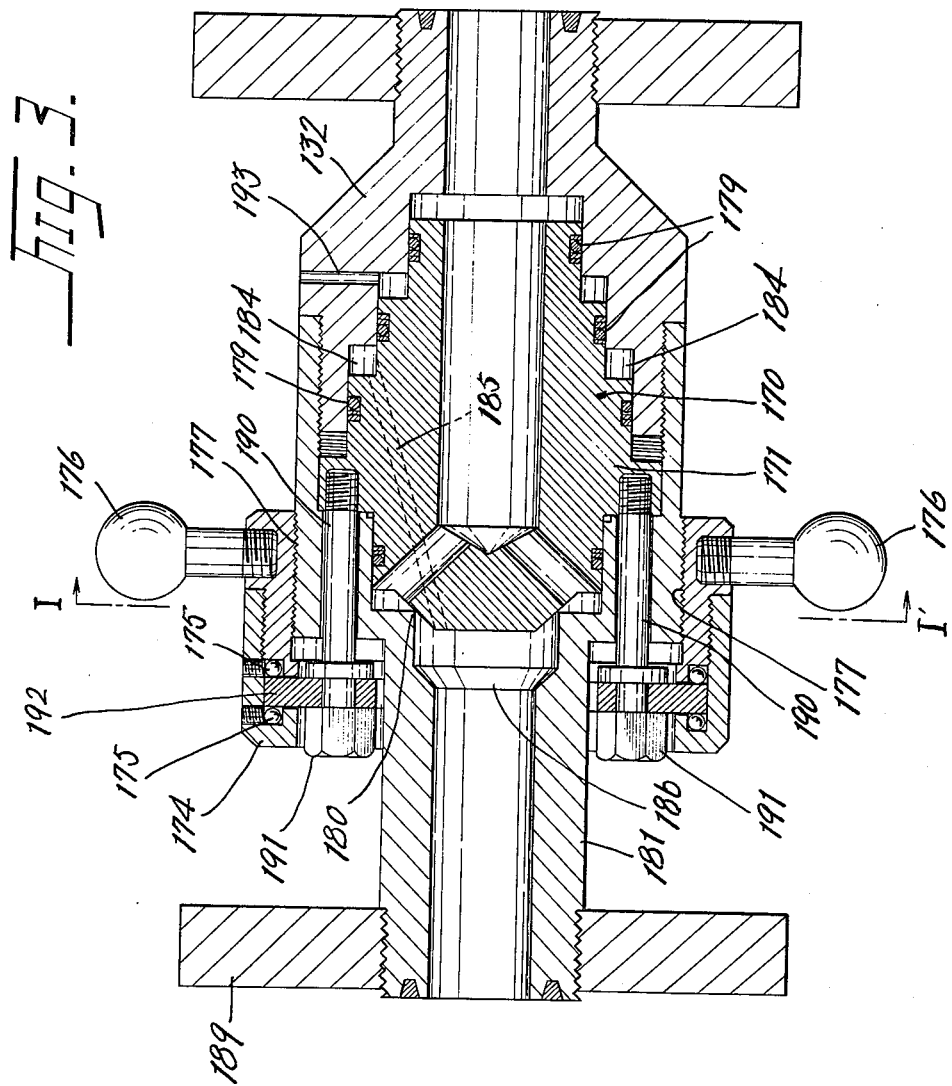
FIG. 3 is a longitudinally sectional view on an enlarged scale of a modified form of flow rate adjusting valve of the invention.
Figure 4:
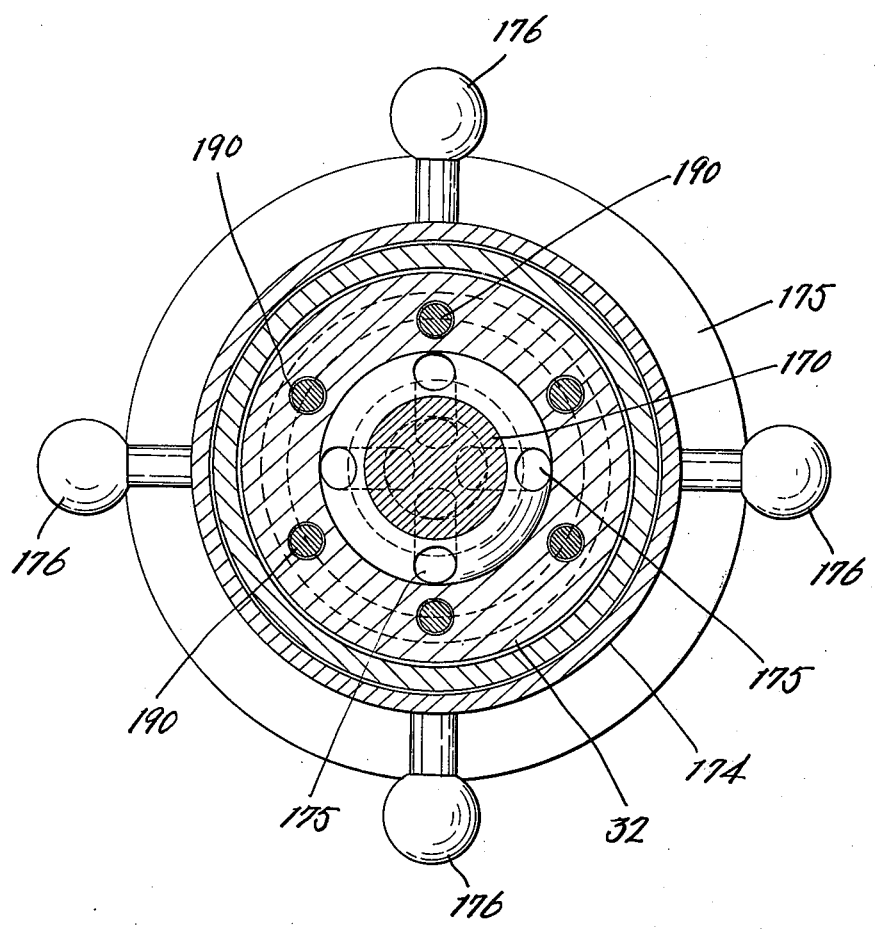
FIG. 4 is a cross sectional view taken substantially along the line I—I' of FIG. 3.

Referring now to FIG. 3, there is shown a second embodiment of a pressure fluid flow rate adjusting valve 170 of the invention. The pressure fluid flow rate adjusting valve 70 of FIG. 3 is substantially similar to the counterpart valve of FIG. 2 except that a plurality of circumferentially spaced threaded rods 190 extend horizontally and forwardly from the front end of the valve body 171 and have one end, that is their inner end, threaded into the valve body and the other or outer ends receive nuts 191 thereon. An annular slidable member 192 which is disposed about the connection rods 190 is journalled in the annular rotary member 174 by means of thrust bearings 175. In FIG. 3, reference numeral 193 denotes an air vent. The operation of the pressure fluid flow rate regulation valve 170 is substantially identical with that for of the valve 70 in the first embodiment and accordingly, a description of the flow rate adjusting valve of the second embodiment will be omitted.

FIG. 5 shows a third embodiment of a pressure fluid flow rate adjusting valve 270 of the invention and the valve 270 is substantially similar to the counterpart valves of FIGS. 1, 2 and 3 except that a threaded air pressure inlet port 294 is provided in the left-hand end portion 232 of the left-hand body half portion 11b in opposition to one side of the largest diameter or pressure receiving section of the valve body 271, a second threaded air pressure inlet port 295 is provided in the insert member 281 in opposition to the other side of the pressure receiving portion of the valve body 271, a coiled spring 296 is provided about the valve body on the side facing to the air pressure inlet port 294 for urging the valve body 271 in the valve closing direction or toward the valve seat 280, a second coiled spring 297 is provided about the valve body 271 on the side facing to the second air pressure inlet port 295 for urging the valve body 271 in the opposite direction or away from the valve seat 280 and a guide rod 298 extends outwardly from the valve body 271 through the insert member 281. The operation of the third embodiment of a pressure fluid flow rate adjusting valve 270 is substantially identical with that of the preceding pressure fluid flow rate adjusting valves 70 and 170 and accordingly, a description of the operation of the operation of the valve 170 of the third embodiment is omitted.

As clear from the foregoing description of the preferred embodiments of the invention, according to the present invention, since the force of the fluid pressure of a predetermined magnitude acting on one side of the pressure receiving portion of the pressure fluid flow rate adjusting valve is counterbalanced by the force of fluid pressure of the same magnitude acting on the opposite side of the valve pressure receiving portion so as to balance between the oppositely directed forces, there is no possibility that fluid will leak out of the pressure fluid regulation valve device of the invention even if the fluid is passed through the valve device under any high pressure and thus, the present invention provides a high pressure valve device which has an extended service life. Also according to the present invention, since the fluid resistance through the pressure fluid regulation valve device is limited to a minimum magnitude, the reference pressure within the valve device can be always maintained constant regardless of any fluctuation in the primary pressure. Furthermore, according to the present invention, since the pressure fluid is passed through the linear passage instead of a meandering passage, the valve plate unit is free of any substantial load and thus, the pressure fluid regulation valve device can operate at a high speed without being subjected to the so-called water hammering action.

In the foregoing, description has been made of only several preferred embodiment of the invention, but it will readily occur to those skilled in the art that the same is illustrative in nature and do not limit the scope of the invention in any way. The scope of the invention is only limited by the appended claims.

What is claimed is:

1. A pressure regulation valve device comprising a main body having a linear axial fluid passage, a valve seat and a pressure regulation chamber, a pressure regulation valve body for seating against and unseating from said valve seat and normally maintained under balanced condition by counterbalancing primary pressure acting on the valve body, said valve body having an intermediately positioned largest diameter pressure receiving portion slidably received within said pressure regulation chamber to define a secondary pressure chamber on one side of the valve body and a reference pressure chamber on the other side of the valve body within the pressure regulation chamber, a primary pressure communication passage provided in said main body adjacent to said valve seat in communication with said reference pressure chamber, a reference pressure setting valve provided in said primary pressure communication passage, and a communication passage leading from a position adjacent to said valve body through said valve body to said secondary pressure chamber in the pressure regulation chamber.

2. The pressure regulation valve device set forth in claim 1, in which a fluid flow regulation rate valve is provided in said axial primary pressure communication passage in the main body of the pressure regulation valve.

3. The pressure regulation valve device as set forth in claim 1, in which a reduced diameter section is formed on said valve body with the same cross-sectional area as that of the high pressure outlet adjacent to said valve seat and a fluid flow rate regulation valve is provided in said axial fluid communication passage in the main body in communication with said communication passage leading from the position adjacent to the inner end of said valve body to said reduced diameter portion of the valve body so as to apply pressure of the same magnitude as, but in opposite direction to, the outlet pressure to thereby balance the valve body.

4. A pressure regulation valve device comprising a hollow cylindrical main body having an axial fluid passage and consisting of two hollow cylindrical half portions threaded together, one of said two half portions including a pressure regulation chamber, a pressure regulation valve body having an axial fluid passage slidably received in said one half body portion and having an enlarged diameter pressure receiving portion which defines a secondary pressure chamber on one side of the pressure receiving portion and a reference pressure chamber on the opposite side of the pressure receiving chamber within said pressure regulation chamber of said one half portion of the main body, a slanted pressure communication passage extending from one end of said valve body to said secondary pressure chamber and a second slanted pressure fluid passages extending from said axial fluid passage in the valve body to the position adjacent to said one end of the valve body, a valve seat formed on said other half body portion adjacent to the inner end of said valve body, a vertical pressure fluid communication passage provided in said other half body portion in communication with said center recess and reference pressure chamber, a reference pressure setting valve provided in said other half body portion in communication with said vertical pressure fluid communication passage, a pressure fluid outlet provided in said other half body portion in communication with said reference pressure chamber, a pressure fluid discharge valve provided in said other half body portion in communication with said pressure fluid outlet, an annular rotary member journalled about said other half body portion and having a plurality of circumferentially spaced handles, a pressure fluid flow rate adjusting valve received in said other half body portion in communication with said axial pressure fluid passage in the main body to define an annular space within the other half body portion, a first slanted fluid passage in said flow rate regulation valve in communication with the interior of said flow rate regulation valve, a second slanted fluid communication passage in said flow rate regulation valve in communication with said annular chamber and an annular insert member threaded into said other half body portion on the outer side of said flow rate adjusting valve.

* * * * *